United States Patent
Nakano et al.

(10) Patent No.: US 11,629,210 B2
(45) Date of Patent: *Apr. 18, 2023

(54) MAINTENANCE LIQUID AND MAINTENANCE METHOD

(71) Applicant: SEIKO EPSON CORPORATION, Tokyo (JP)

(72) Inventors: Keitaro Nakano, Matsumoto (JP); Chigusa Sato, Shiojiri (JP); Mitsuaki Yoshizawa, Minowa-machi (JP)

(73) Assignee: Seiko Epson Corporation, Tokyo (JP)

( * ) Notice: Subject to any disclaimer, the term of this patent is extended or adjusted under 35 U.S.C. 154(b) by 205 days.

This patent is subject to a terminal disclaimer.

(21) Appl. No.: 17/087,741

(22) Filed: Nov. 3, 2020

(65) Prior Publication Data

US 2021/0047592 A1    Feb. 18, 2021

Related U.S. Application Data

(60) Continuation of application No. 16/438,457, filed on Jun. 11, 2019, now Pat. No. 10,858,614, which is a division of application No. 14/661,966, filed on Mar. 18, 2015, now abandoned.

(30) Foreign Application Priority Data

Mar. 19, 2014    (JP) .............................. JP2014-057152

(51) Int. Cl.
| | |
|---|---|
| *C08F 220/18* | (2006.01) |
| *B41J 2/165* | (2006.01) |
| *C08F 2/48* | (2006.01) |
| *C08F 20/28* | (2006.01) |
| *C08K 5/5397* | (2006.01) |
| *C09D 11/101* | (2014.01) |
| *C11D 3/36* | (2006.01) |
| *C11D 11/00* | (2006.01) |
| *C11D 3/37* | (2006.01) |
| *C08F 220/30* | (2006.01) |
| *C08F 220/28* | (2006.01) |

(52) U.S. Cl.
CPC ..... *C08F 220/1807* (2020.02); *B41J 2/16552* (2013.01); *C08F 2/48* (2013.01); *C08F 20/28* (2013.01); *C08F 220/1808* (2020.02); *C08F 220/1811* (2020.02); *C08F 220/1812* (2020.02); *C08F 220/301* (2020.02); *C08F 220/302* (2020.02); *C08K 5/5397* (2013.01); *C09D 11/101* (2013.01); *C11D 3/361* (2013.01); *C11D 3/3757* (2013.01); *C11D 3/3765* (2013.01); *C11D 11/0023* (2013.01); *C11D 11/0047* (2013.01); *C08F 220/282* (2020.02)

(58) Field of Classification Search
CPC ... C09D 11/326; C09D 11/033; C09D 11/324; C09D 11/38; C09D 11/36; C09D 11/322; C09D 11/101; C09D 11/40; C09D 11/30; C09D 11/32; C09D 11/328; C09D 11/102; C09D 11/005; C09D 11/54; C09D 11/52; C09D 11/106; B41J 2/14; B41J 2202/01; B41J 2/16552; B41J 2/01; B41J 2/211; B41J 2/1433; B41J 2/17; B41J 2/17593; B41J 2/2107; B41J 2/1755; B41J 2/2114; B41J 2/2117; B41J 2/2056; B41J 2/21; B41J 2/0057; B41J 3/60; B41J 2002/012; B41J 2/04598; B41J 2/04588; B41J 2/04595; B41J 2/04586; B41J 2/14274; B41J 25/001; B41J 25/34; B41J 25/003; B41J 25/312; B41J 2025/008; B41J 2202/21; B41J 2/17596; B41J 2/16508; B41J 2/1652; B41J 2/16538; B41J 2/175; B41J 2/17563; B41M 5/0023; B41M 5/00; B41M 5/0011; B41M 5/0017; B41M 5/0047; B41M 7/00; B41M 7/0072; B41M 5/52; B41M 5/5218; B41M 5/5227; C08F 220/1807; C08F 2/48; C08F 20/28; C08F 220/1808; C08F 220/1811; C08F 220/1812; C08F 220/301; C08F 220/302; C08F 220/282; C08K 5/5397; C11D 3/361; C11D 3/3757; C11D 3/3765; C11D 11/0023; C11D 11/0047

See application file for complete search history.

(56) References Cited

U.S. PATENT DOCUMENTS

| | | | |
|---|---|---|---|
| 2007/0137519 | A1 | 6/2007 | Sugimoto et al. |
| 2007/0197685 | A1 | 8/2007 | Aruga et al. |
| 2007/0225185 | A1 | 9/2007 | Kasai |
| 2008/0098928 | A1 | 5/2008 | Oyanagi et al. |
| 2008/0186341 | A1 | 8/2008 | Hirate |
| 2009/0046122 | A1 | 2/2009 | Inoue |
| 2011/0074866 | A1 | 3/2011 | Imamura et al. |

(Continued)

FOREIGN PATENT DOCUMENTS

| | | |
|---|---|---|
| EP | 1 621 348 | 2/2006 |
| EP | 1 837 182 | 9/2007 |

(Continued)

*Primary Examiner* — Manish S Shah
(74) *Attorney, Agent, or Firm* — Workman Nydegger

(57) ABSTRACT

There is provided a maintenance liquid, which is used in maintenance of a device equipped with a discharge head for discharging an ultraviolet ray curable-type composition containing the acyl phosphine oxide-based photopolymerization initiator toward an attachment object, including a polymerizable compound in which a saturation solubility of an acyl phosphine oxide-based photopolymerization initiator at 20° C. is equal to or greater than 5.0% by mass.

20 Claims, No Drawings

(56) References Cited

U.S. PATENT DOCUMENTS

| | | | |
|---|---|---|---|
| 2012/0004385 A1* | 1/2012 | Kodama | C11D 3/0063 |
| | | | 528/206 |
| 2012/0274701 A1 | 11/2012 | Zhou et al. | |
| 2012/0274717 A1 | 11/2012 | Nakano et al. | |
| 2013/0010039 A1 | 1/2013 | Kida et al. | |
| 2013/0141504 A1 | 6/2013 | Saito et al. | |
| 2013/0258016 A1 | 10/2013 | Yoshida et al. | |
| 2013/0286121 A1 | 10/2013 | Fukuoto et al. | |
| 2013/0321520 A1 | 12/2013 | Ito et al. | |
| 2014/0048754 A1* | 2/2014 | Kodama | B82Y 40/00 |
| | | | 252/600 |
| 2015/0267148 A1* | 9/2015 | Nakano | C09D 11/101 |
| | | | 522/64 |
| 2015/0315396 A1 | 11/2015 | Kida et al. | |
| 2016/0032226 A1 | 2/2016 | Kameyama et al. | |
| 2016/0046134 A1 | 2/2016 | Fukumoto et al. | |
| 2018/0072047 A1 | 3/2018 | Fukumoto et al. | |
| 2019/0308418 A1* | 10/2019 | Nakano | C09D 11/101 |

FOREIGN PATENT DOCUMENTS

| | | |
|---|---|---|
| EP | 2 987 638 | 2/2016 |
| JP | 2007-254546 | 10/2007 |
| JP | 2012-031389 | 2/2012 |
| JP | 2012-255072 | 12/2012 |
| JP | 2013-060548 | 4/2013 |
| JP | 2013-240979 | 12/2013 |
| JP | 2015-120255 | 7/2015 |
| WO | 2009/090425 | 7/2009 |
| WO | 2014/171488 | 10/2014 |

\* cited by examiner

MAINTENANCE LIQUID AND MAINTENANCE METHOD

CROSS-REFERENCE TO RELATED APPLICATIONS

The present application is a continuation of U.S. application Ser. No. 16/438,457, filed Jun. 11, 2019, which is a divisional application of U.S. application Ser. No. 14/661,966, filed on Mar. 18, 2015, which claims priority under 35 U.S.C. § 119 to Japanese Patent Application No. 2014-057152 filed in the Japanese Patent Office on Mar. 19, 2014, the disclosure of which are incorporated herein by reference in their entireties.

BACKGROUND

1. Technical Field

The present invention relates to a maintenance liquid and a maintenance method.

2. Related Art

In the ink jet recording method, a high-resolution image can be recorded with a relatively simple device, and rapid development has been achieved in various fields. For example, in JP-A-2012-31389, for the purpose of providing a method of reducing defects in a pattern transfer even in the case of performing transfer of an ultra fine pattern, a maintenance liquid which is used in an ink jet device using a pattern forming method including discharging a photocurable composition which has a polymerizable monomer as a main component on a substrate or a mold having a fine pattern using an ink jet device and irradiating the photocurable composition with light in the state of being sandwiched between the substrate and the mold having a fine pattern, and contains a compound having an ester and/or ether functional group is disclosed.

However, in the maintenance liquids in the related art described in JP-A-2012-31389, there is a problem that the polymerization initiator in the ultraviolet ray curable-type composition (photocurable composition) is precipitated at the time of maintenance, and due to this, cleaning ability is reduced. In particular, in the case where a large amount of the polymerization initiator is included in the ultraviolet ray curable-type composition in order to ensure curability, this problem becomes significant.

SUMMARY

An advantage of some aspects of the invention is to provide a maintenance liquid which has a high cleaning ability at the time of maintenance, can suppress reduction in the curability of the ultraviolet ray curable-type composition after maintenance, and can be used in maintenance of the ultraviolet ray curable-type composition having an excellent curability of the ultraviolet ray curable-type composition.

The present inventors repeated thorough studies. As a result, the invention is realized by using a predetermined polymerizable compound.

That is, the invention is as follows.

[1] According to an aspect of the invention, there is provided a maintenance liquid which includes a polymerizable compound in which a saturation solubility of an acyl phosphine oxide-based photopolymerization initiator at 20° C. is equal to or greater than 5.0% by mass, and which is used in maintenance of a device equipped with a discharge head for discharging an ultraviolet ray curable-type composition containing the acyl phosphine oxide-based photopolymerization initiator toward an attachment object.

[2] In the maintenance liquid according to [1], the polymerizable compound may include at least any one of vinyl ether group-containing (meth)acrylic acid ester represented by the following general formula (1) and a monofunctional (meth)acrylate compound having an aromatic ring.

(In the formula (1), $R^1$ represents a hydrogen atom or a methyl group, $R^2$ represents a divalent organic residue having 2 to 20 carbon atoms, and $R^3$ represents a hydrogen atom or a monovalent organic residue having 1 to 11 carbon atoms.)

[3] In the maintenance liquid according to [1] or [2], the viscosity of the polymerizable compound at 20° C. may be equal to or less than 30 mPa·s.

[4] In the maintenance liquid according to any one of [1] to [3], the content of the polymerizable compound may be equal to or greater than 40% by mass with respect to the total amount of the maintenance liquid.

[5] In the maintenance liquid according to any one of [1] to [4], the viscosity at 20° C. may be equal to or less than 20 mPa·s.

[6] In the maintenance liquid according to any one of [1] to [5], the viscosity at 20° C. may be lower than the viscosity of the ultraviolet ray curable-type composition at 20° C. by equal to or greater than 5 mPa·s.

[7] In the maintenance liquid according to any one of [1] to [6], the ultraviolet ray curable-type composition may include the polymerizable compound, and the content of the polymerizable compound in the maintenance liquid is larger than the content of the polymerizable compound in the ultraviolet ray curable-type composition by equal to or greater than 10% by mass.

[8] In the maintenance liquid according to any one of [1] to [7], the saturation solubility of the acyl phosphine oxide-based photopolymerization initiator at 20° C. with respect to the polymerizable compound may be equal to or greater than 8.0% by mass.

[9] The maintenance liquid according to any one of [1] to [8] may further include at least any one of a silicone-based surfactant and a fluorine-based surfactant.

[10] In the maintenance liquid according to any one of [1] to [9], the molecular weight of the polymerizable compound may be equal to or greater than 170.

[11] In the maintenance liquid according to any one of [1] to [10], the content of the acyl phosphine oxide-based photopolymerization initiator in the ultraviolet ray curable-type composition may be equal to or greater than 5.0% by mass.

[12] In the maintenance liquid according to any one of [1] to [11], a solubility parameter may be equal to or greater than 5.0.

[13] In the maintenance liquid according to any one of [1] to [12], the saturation solubility may be a saturation solubility of bis(2,4,6-trimethylbenzoyl)-phenylphosphine oxide at 20° C.

[14] According to another aspect of the invention, there is provided a maintenance method including performing maintenance of a device equipped with a discharge head for discharging an ultraviolet ray curable-type composition containing an acyl phosphine oxide-based photopolymerization initiator toward an attachment object using the maintenance liquid according to any one of [1] to [13].

[15] In the maintenance method according to [14], the device may be equipped with an ultraviolet ray emitting diode for irradiating the discharged ultraviolet ray curable-type composition with ultraviolet rays, and the ultraviolet ray emitting element may have an emission peak wavelength in a range of 360 nm to 420 nm.

[16] In the maintenance method according to [14] or [15], the device may be equipped with a heating mechanism for heating the ultraviolet ray curable-type composition, and may discharge the heated composition.

DESCRIPTION OF EXEMPLARY EMBODIMENTS

Hereinafter, aspects for carrying out the invention (hereinafter, referred to as "the embodiment") will be described in detail. Further, the invention is not limited thereto, and various modifications are possible without departing from the gist of the invention.

Maintenance Liquid

The maintenance liquid of the embodiment includes a polymerizable compound in which a saturation solubility of an acyl phosphine oxide-based photopolymerization initiator at 20° C. is equal to or greater than 5.0% by mass, and is used in maintenance of a device equipped with a discharge head for discharging an ultraviolet ray curable-type composition containing the acyl phosphine oxide-based photopolymerization initiator to an attachment object.

Polymerizable Compound

The maintenance liquid of the embodiment includes a polymerizable compound in which a saturation solubility of an acyl phosphine oxide-based photopolymerization initiator at 20° C. is equal to or greater than 5.0% by mass. By including such a polymerizable compound, cleaning ability at the time of maintenance is further improved, and reduction in the curability of an ultraviolet ray curable-type composition after maintenance can be further suppressed.

In addition, the saturation solubility of the acyl phosphine oxide-based photopolymerization initiator in the polymerizable compound at 20° C. is equal to or greater than 5.0% by mass, preferably equal to or greater than 8.0% by mass, and more preferably equal to or greater than 10% by mass. The polymerizable compound, in which the saturation solubility is equal to or greater than 5.0% by mass, tends to further improve cleaning ability at the time of maintenance. Moreover, the upper limit of the saturation solubility of the acyl phosphine oxide-based photopolymerization initiator in the polymerizable compound at 20° C. is not particularly limited, however, the upper limit is preferably equal to or less than 20% by mass.

The content of the polymerizable compound is preferably equal to or greater than 40% by mass, more preferably equal to or greater than 50% by mass, still more preferably equal to or greater than 65% by mass with respect to the total amount of the maintenance liquid. When the content of the polymerizable compound is equal to or greater than 40% by mass, there is a tendency that cleaning ability at the time of maintenance is further improved, and reduction in the curability of the ultraviolet ray curable-type composition after maintenance is further suppressed. In addition, the content of the polymerizable compound is preferably equal to or less than 90% by mass, more preferably equal to or less than 85% by mass, and still more preferably equal to or less than 80% by mass with respect to the total amount of the maintenance liquid. When the content of the polymerizable compound is equal to or less than 90% by mass, flexibility of design of the maintenance liquid is increased, and thus, balance with other characteristics such as reduction in viscosity of the maintenance liquid becomes excellent in some cases.

In particular, the content of the polymerizable compound in which the saturation solubility of the acyl phosphine oxide-based photopolymerization initiator at 20° C. is equal to or greater than 8.0% by mass is preferably 30% by mass to 80% by mass, and more preferably 40% by mass to 80% by mass, still more preferably 50% by mass to 80% by mass. When the content of the polymerizable compound in which the saturation solubility of the acyl phosphine oxide-based photopolymerization initiator at 20° C. is equal to or greater than 8.0% by mass is in the above range, there is a tendency that cleaning ability at the time of maintenance is further improved, and reduction in the curability of the ultraviolet ray curable-type composition after maintenance is further suppressed.

The saturation solubility of the acyl phosphine oxide-based photopolymerization initiator at 20° C. can be obtained by a method for measuring a saturation solubility in Examples described below. Moreover, the acyl phosphine oxide-based photopolymerization initiators at the time of determining the saturation solubility of the acyl phosphine oxide-based photopolymerization initiator in the polymerizable compound at 20° C. are the same as those used in the measurement of the saturation solubility in Examples described below.

The polymerizable compound is not particularly limited, and for example, monofunctional, bifunctional, and tri- or higher functional monomers and oligomers known in the related art can be used. The polymerizable compounds may be used alone or two or more kinds may be used in combination. Among these, the polymerizable compound preferably includes at least any one of vinyl ether group-containing (meth)acrylic acid ester represented by the following general formula (1) and a monofunctional (meth)acrylate compound having an aromatic ring. The polymerizable compounds may be used alone or two or more kinds may be used in combination.

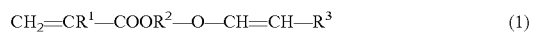

(In the above formula (1), $R^1$ represents a hydrogen atom or a methyl group, $R^2$ represents a divalent organic residue having 2 to 20 carbon atoms, and $R^3$ represents a hydrogen atom or a monovalent organic residue having 1 to 11 carbon atoms.)

Vinyl Ether Group-Containing (Meth)acrylic Acid Ester

When the maintenance liquid contains vinyl ether group-containing (meth)acrylic acid ester represented by the general formula (1), there is a tendency that cleaning ability at the time of maintenance is further improved, and reduction in the curability of the ultraviolet ray curable-type composition after maintenance is further suppressed.

Examples of the divalent organic residue having 2 to 20 carbon atoms represented by $R^2$ in the general formula (1) include a linear, branched, or cyclic alkylene group having 2 to 20 carbon atoms, which may have been substituted, an alkylene group having 2 to 20 carbon atoms, which may have been substituted, having an oxygen atom by an ether bond and/or an ester group in the structure, and a divalent aromatic group having 6 to 11 carbon atoms, which may have been substituted. Among these, an alkylene group having 2 to 6 carbon atoms such as an ethylene group, an n-propylene group, an isopropylene group, or a butylene group, and an alkylene group having 2 to 9 carbon atoms having an oxygen atom by an ether bond in the structure, such as an oxyethylene group, an oxy-n-propylene group, an oxyiso propylene group, or an oxybutylene group are suitably used.

As the monovalent organic residue having 1 to 11 carbon atoms represented by $R^3$ in the general formula (1), a linear, branched, or cyclic alkyl group having 1 to 11 carbon atoms, which may have been substituted, and a monovalent aromatic group having 6 to 11 carbon atoms, which may have been substituted, are suitable. Among these, an alkyl group having 1 or 2 carbon atoms, which is a methyl group or an ethyl group and a monovalent aromatic group having 6 to 8 carbon atoms such as a phenyl group or a benzyl group are suitably used.

In a case where each organic residue described above is a group which may have been substituted, the substituent is divided into a group which has a carbon atom and a group which does not have a carbon atom. First, in a case where the above substituent is a group having a carbon atom, the number of the carbon atom is counted in the number of carbon atoms in the organic residue. Next, examples of the group having a carbon atom, which are not particularly limited, include a carboxyl group and an alkoxy group. Next, examples of the group not having a carbon atom, which are not particularly limited, include a hydroxyl group and a halo group.

Examples of the vinyl ether group-containing (meth)acrylic acid ester, which are not particularly limited, include 2-(2-vinyloxyethoxy)ethyl acrylate.

The content of the vinyl ether group-containing (meth)acrylic acid ester is preferably 15% by mass to 55% by mass, more preferably 20% by mass to 50% by mass, still more preferably 25% by mass to 45% by mass with respect to the total amount of the maintenance liquid. When the content of the vinyl ether group-containing (meth)acrylic acid ester is equal to or greater than 15% by mass, curability tends to be further improved. On the other hand, when the content of the vinyl ether group-containing (meth)acrylic acid ester is equal to or less than 55% by mass, preservation stability tends to be further improved.

Monofunctional (Meth)acrylate Compound Having Aromatic Ring

Examples of the monofunctional (meth)acrylate compound having an aromatic ring, which are not particularly limited, include phenoxyethyl acrylate, 2-hydroxy-3-phenoxypropyl acrylate, and benzyl acrylate. The monofunctional (meth)acrylate compound having an aromatic ring may be used alone or two or more kinds may be used in combination.

The content of the monofunctional (meth)acrylate compound having an aromatic ring is preferably 5.0% by mass to 90% by mass, more preferably 10% by mass to 85% by mass, still more preferably 15% by mass to 80% by mass with respect to the total amount of the maintenance liquid. When the content of the monofunctional (meth)acrylate compound having an aromatic ring is equal to or greater than 5.0% by mass, curability tends to be further improved. On the other hand, when the content of the monofunctional (meth)acrylate compound having an aromatic ring is equal to or less than 90% by mass, friction resistance tends to be further improved.

The molecular weight of the polymerizable compound included in the maintenance liquid is preferably equal to or greater than 170, more preferably equal to or greater than 190, and still more preferably equal to or greater than 210. When the molecular weight of the polymerizable compound is equal to or greater than 170, odor tends to be less likely to occur. In addition, although the upper limit of the molecular weight of the polymerizable compound is not particularly limited, the upper limit is preferably equal to or less than 300.

The viscosity of the polymerizable compound included in the maintenance liquid at 20° C. is preferably equal to or less than 30 mPa·s, more preferably equal to or less than 20 mPa·s, and still more preferably equal to or less than 15 mPa·s. When the viscosity of the polymerizable compound included in the maintenance liquid at 20° C. is equal to or less than 30 mPa·s, cleaning ability tends to be further improved. Although the lower limit of the viscosity of the polymerizable compound at 20° C. is not particularly limited, the lower limit is preferably equal to or greater than 1 mPa·s. Moreover, in a case where the maintenance liquid includes plural polymerizable compounds as a mixture, the viscosity described here refers to the viscosity of the mixture.

Moreover, the maintenance liquid may further include a polymerizable compound in which the saturation solubility of the acyl phosphine oxide-based photopolymerization initiator at 20° C. is less than 5.0% by mass. Examples of the polymerizable compound, which are not particularly limited, include dipropylene glycol diacrylate, isobornyl acrylate, dipentaerythritol hexaacrylate, isooctyl acrylate, and lauryl acrylate.

Surfactant

The maintenance liquid of the embodiment may include a surfactant. Examples of the surfactant, which are not particularly limited, include a silicone-based surfactant, a fluorine-based surfactant, and an acetylene glycol surfactant. Among these, the surfactant in the embodiment preferably includes at least any one of the silicone-based surfactant and the fluorine-based surfactant.

Examples of the silicone-based surfactant include a polysiloxane-based compound and polyether-modified organosiloxane. Specific examples of commercially available products of the silicone-based surfactants, which are not particularly limited, include BYK-306, BYK-307, BYK-333, BYK-341, BYK-345, BYK-346, BYK-347, BYK-348, BYK-349, and BYK-UV3500 (hereinbefore, all are trade names, manufactured by BYK Japan KK), and KF-351A, KF-352A, KF-353, KF-354L, KF-355A, KF-615A, KF-945, KF-640, KF-642, KF-643, KF-6020, X-22-4515, KF-6011, KF-6012, KF-6015, and KF-6017 (hereinbefore, all are trade names, manufactured by Shin-Etsu Chemicals Co., Ltd.).

Examples of the fluorine-based surfactant, which are not particularly limited, include a perfluoroalkyl sulfonate, a perfluoroalkyl carboxylate, a perfluoroalkyl phosphoric acid ester, a perfluoroalkyl ethylene oxide adduct, a perfluoroalkyl betaine, and a perfluoroalkyl amine oxide compound. Examples of commercially available products of the fluorine-based surfactant, which are not particularly limited, include S-144 and S-145 (manufactured by Asahi Glass Co., Ltd.); FC-170C, FC-430, and Fluorad-FC4430 (manufactured by Sumitomo 3M Ltd.); FSO, FSO-100, FSN, FSN-100, and FS-300 (manufactured by Dupont); and FT-250, and 251 (manufactured by Neos Company Limited). The fluorine-based surfactants may be used alone or two or more kinds may be used in combination.

The acetylene glycol-based surfactant are not particularly limited, and for example, one or more kinds selected from an alkylene oxide adduct of 2,4,7,9-tetramethyl-5-decyne-4,7-diol and 2,4,7,9-tetramethyl-5-decyne-4,7-diol, and an alkylene oxide adduct of 2,4-dimethyl-5-decyn-4-ol and 2,4-dimethyl-5-decyn-4-ol are preferable. Examples of commercially available products of the acetylene glycol-based surfactant, which are not particularly limited, include Olfine 104 series, and E series (trade name, manufactured by Air Products Japan, Inc.) such as Olfine E1010, and Surfynol 465 and Surfynol 61 (trade name, manufactured by Nissin Chemical Industry Co., Ltd.). The acetylene glycol-based surfactants may be used alone or two or more kinds may be used in combination.

The content of the surfactant is preferably 0.1% by mass to 5% by mass, and more preferably 0.1% by mass to 3% by mass with respect to the total amount of the maintenance liquid. When the content of the surfactant is in the above range, there is a tendency that wettability of the maintenance liquid with respect to the portion contacting the maintenance liquid of a recording apparatus is further improved, and cleaning ability is further improved.

Polymerization Inhibitor

The maintenance liquid of the embodiment may include a polymerization inhibitor. Examples of the polymerization inhibitor, which are not particularly limited, include hydroquinones such as hydroquinone, hydroquinone monomethyl ether (MEHQ), 1-o-2,3,5-trimethyl hydroquinone, and 2-tert-butylhydroquinone; catechols such as catechol, 4-methyl catechol, and 4-tert-butylcatechol; phenols such as phenol, butyl hydroxytoluene, butyl hydroxyanisole, p-methoxyphenol, cresol, pyrogallol, 3,5-di-t-butyl-4-hydroxytoluene, 2,2'-methylenebis(4-methyl-6-t-butylphenol), 2,2'-methylenebis(4-ethyl-6-butylphenol), and 4,4'-thiobis(3-methyl-6-t-butylphenol); and hindered amines such as a compound having a 2,2,6,6-tetramethylpiperidine-N-oxyl skeleton, a compound having a 2,2,6,6-tetramethylpiperidine skeleton, a compound having a 2,2,6,6-tetramethylpiperidine-N-alkyl skeleton, and a compound having a 2,2,6,6-tetramethylpiperidine-N-acyl skeleton. Moreover, the polymerization inhibitors may be used alone or two or more kinds may be used in combination.

The content of the polymerization inhibitor is preferably 0.050% by mass to 0.50% by mass, more preferably 0.10% by mass to 0.40% by mass, still more preferably 0.15% by mass to 0.25% by mass with respect to the total amount of the maintenance liquid. When the content of the polymerization initiator is equal to or greater than 0.050% by mass, cleaning ability at the time of maintenance tends to be further improved. In addition, when the content of the polymerization initiator is equal to or less than 0.50% by mass, reduction in the curability of an ultraviolet ray curable-type composition after maintenance tends to be further suppressed.

Solvent

The maintenance liquid of the embodiment may further include a solvent. The solvent is not particularly limited, and for example, an organic solvent or water can be used.

Examples of the water include water in which ionic impurities are removed as much as possible such as ultrapure water and pure water such as ion exchange water, ultrafiltrated water, reverse osmosis water, or distilled water. In addition, when water sterilized by irradiating with an ultraviolet ray or adding hydrogen peroxide is used, it is possible to prevent generation of fungi or bacteria in a case where the maintenance liquid is stored for a long period of time. Thus, storage stability tends to be further improved.

Examples of the organic solvent, which are not particularly limited, include alcohols or glycols such as glycerin, ethylene glycol, diethylene glycol, triethylene glycol, propylene glycol, dipropylene glycol, 1,3-propanediol, 1,2-butanediol, 1,2-pentanediol, 1,2-hexane diol, 1,4-butanediol, 1,5-pentane diol, 1,6-hexane diol, diethylene glycol mono-n-propyl ether, ethylene glycol mono-iso-propyl ether, diethylene glycol mono-iso-propyl ether, ethylene glycol mono-n-butyl ether, ethylene glycol mono-t-butyl ether, diethylene glycol mono-n-butyl ether, triethylene glycol monobutyl ether, diethylene glycol mono-t-butyl ether, propylene glycol monomethyl ether, propylene glycol monoethyl ether, propylene glycol mono-t-butyl ether, propylene glycol mono-n-propyl ether, propylene glycol mono-iso-propyl ether, propylene glycol mono-n-butyl ether, dipropylene glycol mono-n-butyl ether, dipropylene glycol mono-n-propyl ether, dipropylene glycol mono-iso-propyl ether, tripropylene glycol monomethyl ether, diethylene glycol dimethyl ether, diethylene glycol diethyl ether, diethylene glycol dibutyl ether, diethylene glycol ethyl methyl ether, diethylene glycol butyl methyl ether, triethylene glycol dimethyl ether, tetraethylene glycol dimethyl ether, dipropylene glycol dimethyl ether, dipropylene glycol diethyl ether, tripropylene glycol dimethyl ether, methanol, ethanol, n-propyl alcohol, iso-propyl alcohol, n-butanol, 2-butanol, tert-butanol, iso-butanol, n-pentanol, 2-pentanol, 3-pentanol, and tert-pentanol; N,N-dimethylformamide, N,N-dimethylacetamide, 2-pyrrolidone, N-methyl-2-pyrrolidone, 2-oxazolidone, 1,3-dimethyl-2-imidazolidinone, dimethyl sulfoxide, sulfolane, and 1,1,3,3-tetramethyl urea. The organic solvents may be used alone or two or more kinds may be used in combination.

Other Components

In the maintenance liquid of the embodiment, various additives such as a solubilizer, a viscosity modifier, a pH adjusting agent, an antioxidant, a preservative, an antifungal agent, a corrosion inhibitor, and a chelating agent for capturing metal ions which affect dispersion can also be suitably added in order to maintain the preservation stability thereof and the discharge stability of the head to be excellent, to improve the clogging, or to prevent deterioration of the maintenance liquid.

Viscosity

The viscosity of the maintenance liquid at 20° C. is preferably equal to or less than 20 mPa·s, more preferably equal to or less than 17.5 mPa·s, and still more preferably equal to or less than 15 mPa·s. When the viscosity of the maintenance liquid at 20° C. is in the above-described range, cleaning ability at the time of maintenance tends to be further excellent. In addition, although the lower limit of the viscosity of the maintenance liquid at 20° C. is not particularly limited, the lower limit is preferably equal to or greater than 5.0 mPa·s. The viscosity can be measured by the methods described in Examples.

The viscosity of the maintenance liquid at 20° C. is lower than the viscosity of an ultraviolet ray curable-type composition at 20° C. preferably by equal to or greater than 5.0 mPa·s, more preferably by equal to or greater than 4.0 mPa·s, and still more preferably by equal to or greater than 3.0 mPa·s. When the viscosity of the maintenance liquid at 20° C. is lower than the viscosity of an ultraviolet ray curable-type composition at 20° C. by equal to or greater than 5.0 mPa·s, cleaning ability at the time of maintenance tends to be further improved.

The solubility parameter of the maintenance liquid is preferably equal to or greater than 5.0, more preferably equal to or greater than 7.5, and still more preferably equal to or greater than 10. When the solubility parameter of the maintenance liquid is equal to or greater than 5.0, cleaning ability at the time of maintenance tends to be further improved. Moreover, although the upper limit of the solubility parameter of the maintenance liquid is not particularly limited, the upper limit is preferably equal to or less than 20.

In addition, the solubility parameter of the maintenance liquid is greater than the solubility parameter of an ultraviolet ray curable-type composition described below preferably by equal to or greater than 0.50, more preferably by equal to or greater than 1.0, and still more preferably by equal to or greater than 2.0. When the solubility parameter of the maintenance liquid is greater than the solubility parameter of an ultraviolet ray curable-type composition by equal to or greater than 0.5, cleaning ability at the time of maintenance tends to be further improved.

Moreover, the solubility parameter (SP value) of a composition (maintenance liquid and ultraviolet ray curable-type composition) can be determined by the following equation.

Solubility parameter (SP value)=solubility of acyl phosphine oxide-based photopolymerization initiator in polymerizable compound×content (% by mass) with respect to composition (100 parts by mass) of the polymerizable compound÷100

(In a case where the composition includes plural polymerizable compounds, the solubility parameter is the sum total obtained by adding the above values.)

Maintenance

The maintenance liquid of the embodiment is used in maintenance of a device equipped with a discharge head for discharging an ultraviolet ray curable-type composition containing an acyl phosphine oxide-based photopolymerization initiator toward an attachment object. Hereinafter, a recording apparatus as an embodiment of the device will be described, and the device may be a device equipped with a discharge head. Here, the term "maintenance" refers to cleaning a recording apparatus, replacing an ultraviolet ray curable-type composition in a composition flow path in the recording apparatus with the maintenance liquid, and filling the inside of the composition flow path with the maintenance liquid. Here, the term "composition flow path" refers to a flow path for circulating an ultraviolet ray curable-type composition in a recording apparatus. Examples of the composition flow path include an ultraviolet ray curable-type composition container for storing the ultraviolet ray curable-type composition, a supply path for supplying the ultraviolet ray curable-type composition from the ultraviolet ray curable-type composition container to a discharge head, and a flow path for circulating the ultraviolet ray curable-type composition in the discharge head to a nozzle opening.

A cleaning target member is at least any one of all members to which an ultraviolet ray curable-type composition can be attached, such as a composition flow path, the inside of head, a nozzle plate, a cap, and a wiper of a recording apparatus. Examples of the cleaning method, which are not particularly limited, include a method of circulating a maintenance liquid to the composition flow path of a recording apparatus and a method of attaching a maintenance liquid to a nozzle plate, a cap, and a wiper.

A method of replacing the ultraviolet ray curable-type composition in the composition flow path of a recording apparatus with the maintenance liquid, and a method of filling the inside of the composition flow path with the maintenance liquid are not particularly limited. For example, in the case of increasing the initial filling ability of the ultraviolet ray curable-type composition, before filling with the ultraviolet ray curable-type composition, it is preferable to fill the ultraviolet ray curable-type composition container on the upstream side with the maintenance liquid. As a result, it is possible to efficiently remove bubbles generated in the ultraviolet ray curable-type composition container when filling with the ultraviolet ray curable-type composition and bubbles in the ultraviolet ray curable-type composition flow path, and it is possible to improve the filling ability of the ultraviolet ray curable-type composition.

In addition, in the case where an image is not recorded using the recording apparatus for a long period of time or a discharge failure occurs, it is possible to replace the ultraviolet ray curable-type composition in the composition flow path with the maintenance liquid. The replacement with the maintenance liquid can be performed by replacing the ultraviolet ray curable-type composition in the composition flow path with the maintenance liquid by flowing the maintenance liquid into the composition flow path filled with the ultraviolet ray curable-type composition. At this time, before the maintenance liquid is flowed into, the ultraviolet ray curable-type composition in the composition flow path may be discharged out of the system.

On the other hand, in the case where recording is restarted using the recording apparatus, the maintenance liquid may be replaced with the ultraviolet ray curable-type composition by flowing the ultraviolet ray curable-type composition into the composition flow path filled with the maintenance liquid and discharging the maintenance liquid from a nozzle opening. At this time, before the ultraviolet ray curable-type composition is flowed into, the maintenance liquid in the composition flow path may be discharged from the nozzle opening.

In addition, when filling the composition flow path with the ultraviolet ray curable-type composition or the maintenance liquid, filling may be performed by changing the ultraviolet ray curable-type composition and the maintenance liquid by a normal cleaning operation. In addition, filling may be performed by capping a cap having a through hole on the nozzle opening surface of the discharge head, by generating a negative pressure in the cap by a suction pump which communicates with the through hole through a tube, and by circulating the ultraviolet ray curable-type composition or the maintenance liquid into the composition flow path.

In this manner, by using the maintenance liquid, it is possible to prevent a cured product derived from the ultraviolet ray curable-type composition from remaining on members to which the ultraviolet ray curable-type composition can be attached, such as a composition flow path, a nozzle plate, a cap, and a wiper of the recording apparatus.

Recording Apparatus

The recording apparatus is equipped with a discharge head for discharging the ultraviolet ray curable-type composition containing the acyl phosphine oxide-based photopolymerization initiator toward an attachment object. More specifically, the recording apparatus is equipped with a composition supply system, and performs recording by discharging the ultraviolet ray curable-type composition supplied from the ultraviolet ray curable-type composition container to the discharge head toward an attachment object from the discharge head. Hereinafter, the recording apparatus of the embodiment will be described in detail.

Discharge Head

The discharge head discharges the ultraviolet ray curable-type composition containing the acyl phosphine oxide-based photopolymerization initiator toward an attachment object. Due to this, the ultraviolet ray curable-type composition is attached to the attachment object. The discharge head is preferably equipped with a heating mechanism for heating the ultraviolet ray curable-type composition. Thus, the viscosity of the ultraviolet ray curable-type composition can be reduced, and thus, the recording apparatus has an excellent discharge stability.

The recording apparatus is preferably equipped with a light source irradiating the ultraviolet ray curable-type composition attached to the attachment object with ultraviolet rays (ultraviolet light). The photopolymerization initiator included in the ultraviolet ray curable-type composition is decomposed by irradiation with ultraviolet rays from a light source, due to this, initiating species such as a radical, an acid, and a base are generated, and the polymerization reaction of the polymerizable compound is promoted by functions of the initiating species. Alternatively, the polymerization reaction of the polymerizable compound included in the ultraviolet ray curable-type composition is initiated by irradiation with ultraviolet rays.

As the light source (ultraviolet rays source), a semiconductor light source is preferable. Examples of the semiconductor light source include ultraviolet ray emitting elements (light emitting diodes) such as an ultraviolet ray emitting diode (UV-LED) and an ultraviolet ray laser diode (UV-LD). Among these, the recording apparatus is preferably equipped with an ultraviolet ray emitting element for irradiating the discharged ultraviolet ray curable-type composition with ultraviolet rays. By using the semiconductor light source, miniaturization and a long life of the recording apparatus, and a high efficiency of a recording method, reduction in power consumption, reduction in heat generation, and reduction in cost are possible compared to a case of using a metal halide light source or a mercury lamp. In addition, the emission peak wavelength of the ultraviolet ray emitting diode is preferably in a range of 360 nm to 420 nm. By using such a peak wavelength, the curability of the ultraviolet ray curable-type composition tends to be further improved. The energy of irradiation with respect to the ultraviolet ray curable-type composition attached to the attachment object is preferably 100 mJ/cm$^2$ to 1000 mJ/cm$^2$, and more preferably 200 mJ/cm$^2$ to 600 mJ/cm$^2$ in terms of performing sufficient curing.

Composition Supply System

For example, the composition supply system is equipped with an ultraviolet ray curable-type composition container, a discharge head having a nozzle for discharging the ultraviolet ray curable-type composition, and a composition supply path which connects the ultraviolet ray curable-type composition container and the discharge head, and supplies the above-described liquid from the ultraviolet ray curable-type composition container to the discharge head.

The recording apparatus equipped with the composition supply system can be classified into several types according to a system of the recording apparatus or a supply system of the ultraviolet ray curable-type composition. Examples of the system of the recording apparatus include two-dimensional recording apparatuses such as a line printer and a serial printer, and three-dimensional recording apparatuses. The line printer is a printer equipped with a line head having a length corresponding to the width of the attachment object, and in the line printer, a head is fixed so as (almost) not to be moved, and printing is performed in one pass (single pass).

On the other hand, in the serial printer, while a head reciprocates (shuttle-moves) in the direction perpendicular to a transportation direction of an attachment object, printing is performed in two or more passes (multi passes). In addition, the three-dimensional recording apparatus forms a three-dimensional object by stacking cross-sectional shapes based on the data of Computer Aided Design (CAD). In addition, as the supply system of the ultraviolet ray curable-type composition, an off-carriage type in which the ultraviolet ray curable-type composition container and the discharge head of a carriage are connected by a composition supply path such as a tube or the like can be exemplified.

Attachment Object

The attachment object refers to a two-dimensional recording medium in the case of the two-dimensional recording apparatus. In addition, in the case of the three-dimensional recording apparatus of stacking cross-sectional shape patterns by repeating a step in which the ultraviolet ray curable-type composition is discharged to a stage, a cross-sectional shape pattern is manufactured by curing the discharged ultraviolet ray curable-type composition by irradiation with ultraviolet rays, the ultraviolet ray curable-type composition is further discharged to the manufactured cross-sectional shape pattern, and the discharged ultraviolet ray curable-type composition is cured, the attachment object becomes a stage or a cured ultraviolet ray curable-type composition.

As the two-dimensional recording apparatus, an absorbing recording medium or a non-absorbing recording medium can be exemplified. Examples of the absorbing recording medium, which are not particularly limited, include plain paper such as electrophotographic paper in which penetrability of the ultraviolet ray curable-type composition is high, ink jet paper (paper used exclusively for an ink jet provided with an ultraviolet ray curable-type composition absorbing layer composed of silica particles or alumina particles, or an ultraviolet ray curable-type composition absorbing layer composed of a hydrophilic polymer such as polyvinyl alcohol (PVA) or polyvinyl pyrrolidone (PVP)), and art paper, coated paper, and cast paper used in general offset printing in which penetrability of the ultraviolet ray curable-type composition is relatively low.

In addition, examples of the non-absorbing recording medium, which are not particularly limited, include films or plates made of plastics such as polyvinyl chloride, polyethylene, polypropylene, and polyethylene terephthalate (PET), plates made of metals such as iron, silver, copper, and aluminum, metal plates or films made of plastic produced by deposition of these various metals, plates made of alloy of stainless or brass, and the like.

Ultraviolet Ray Curable-Type Composition

The ultraviolet ray curable-type composition contains the acyl phosphine oxide-based photopolymerization initiator. In addition, the ultraviolet ray curable-type composition preferably includes the polymerizable compound which can be included in the maintenance liquid.

Acyl Phosphine Oxide-Based Photopolymerization Initiator

The acyl phosphine oxide-based photopolymerization initiator is suitable for curing of the ultraviolet ray curable-type composition using an LED of long wavelength light. Thus, by using the acyl phosphine oxide-based photopolymerization initiator, there is a tendency that a curing process by UV-LED becomes excellent, and the curability and the adhesiveness of the ultraviolet ray curable-type composition are further improved. The maintenance liquid of the embodiment can be used in the recording apparatus using the ultraviolet ray curable-type composition including such a polymerization initiator. Moreover, in the case of using the acyl phosphine oxide-based photopolymerization initiator, there is a problem that the acyl phosphine oxide-based photopolymerization initiator is likely to precipitate at the time of maintenance, however, in the case of using the maintenance liquid of the embodiment, it is possible to suppress such precipitation, and cleaning ability is excellent.

The acyl phosphine oxide-based photopolymerization initiator included in the ultraviolet ray curable-type composition may be the same as that used in the measurement of the saturation solubility in Examples with respect to the polymerizable compound included in the maintenance liquid, may be other acyl phosphine oxide-based photopolymerization initiators, and may include plural types of acyl phosphine oxide-based photopolymerization initiators. The tendency of the magnitude of solubility with respect to the polymerizable compound of other acyl phosphine oxide-based photopolymerization initiators has also the same tendency as that of the acyl phosphine oxide-based photopolymerization initiator used in the measurement of the saturation solubility in Examples, and in the present embodiment, by using the polymerizable compound in which the saturation solubility at 20° C. of the acyl phosphine oxide-based photopolymerization initiator used in the measurement of the saturation solubility in Examples is equal to or greater than 5.0% by mass in the maintenance liquid, it is possible to exhibit the effect described above in maintenance of a device equipped with a discharge head for discharging the ultraviolet ray curable-type composition containing other various acyl phosphine oxide-based photopolymerization initiators. As the acyl phosphine oxide-based photopolymerization initiator included in the ultraviolet ray curable-type composition, the acyl phosphine oxide-based photopolymerization initiator used in the measurement of the saturation solubility in Examples is more preferable, or other acyl phosphine oxide-based photopolymerization initiators in which the saturation solubility in the case of measuring in the same manner as in the measurement of the saturation solubility in Examples except for using other acyl phosphine oxide-based photopolymerization initiators becomes greater than the saturation solubility measured in the measurement of the saturation solubility in Examples are also more preferable.

Specific examples of the acyl phosphine oxide-based photopolymerization initiator, which are not particularly limited, include bis(2,4,6-trimethylbenzoyl)-phenylphosphine oxide, 2,4,6-trimethylbenzoyl-diphenyl-phosphine oxide, and bis-(2,6-dimethoxybenzoyl)-2,4,4-trimethylpentyl phosphine oxide.

Examples of commercially available products of the acyl phosphine oxide-based photopolymerization initiator, which are not particularly limited, include IRGACURE 819 (bis (2,4,6-trimethylbenzoyl)-phenylphosphine oxide), DAROCUR TPO (2,4,6-trimethylbenzoyl-diphenyl-phosphine oxide), and bis-(2,6-dimethoxybenzoyl)-2,4,4-trimethylpentyl phosphine oxide.

The content of the acyl phosphine oxide-based photopolymerization initiator is preferably equal to or greater than 5.0% by mass, more preferably equal to or greater than 6.0% by mass, and still more preferably equal to or greater than 8.0% by mass with respect to the total amount of the ultraviolet ray curable-type composition. When the content of the acyl phosphine oxide-based photopolymerization initiator is equal to or greater than 5.0% by mass, the curability of the ultraviolet ray curable-type composition tends to be further improved. In addition, the content of the acyl phosphine oxide-based photopolymerization initiator is preferably equal to or less than 12% by mass, and more preferably equal to or less than 10% by mass with respect to the total amount of the ultraviolet ray curable-type composition. When the content of the acyl phosphine oxide-based photopolymerization initiator is equal to or less than 12% by mass, cleaning ability at the time of maintenance tends to be further improved.

Polymerizable Compound

As the polymerizable compound, polymerizable compounds exemplified as polymerizable compounds which can be included in the maintenance liquid, and other polymerizable compounds can be exemplified. By using the polymerizable compound in the maintenance liquid, the maintenance liquid can be used as a head filling liquid, it is possible to reduce the head attack properties in the case of being in a state of being filled for a long period of time, and it is possible to improve re-replacement properties at the time of re-replacing with the ultraviolet ray curable-type composition after maintenance.

The total content of the polymerizable compound in the maintenance liquid is greater than the total amount of the polymerizable compound in the ultraviolet ray curable-type composition preferably by equal to or greater than 10% by mass, and more preferably by 15% by mass to 20% by mass. When the content of the polymerizable compound in the maintenance liquid is greater than the content of the polymerizable compound in the ultraviolet ray curable-type composition by equal to or greater than 10% by mass, there is a tendency that cleaning ability at the time of maintenance is further improved, and reduction in the curability of the ultraviolet ray curable-type composition after maintenance is further suppressed.

Other Components

In the ultraviolet ray curable-type composition used in the embodiment, various additives such as a coloring material such as a pigment or a dye, a solubilizer, a viscosity modifier, a pH adjusting agent, an antioxidant, a preservative, an antifungal agent, a corrosion inhibitor, and a chelating agent for capturing metal ions which affect dispersion can be suitably added.

Maintenance Method

The maintenance method of the embodiment has a step of performing maintenance of a recording apparatus equipped with a discharge head for discharging the ultraviolet ray curable-type composition containing the acyl phosphine oxide-based photopolymerization initiator toward an attachment object using the maintenance liquid.

As the recording apparatus, the same apparatus as that described above can be exemplified. Specific examples of the operation performed in the maintenance step include cleaning of the recording apparatus, replacement of the ultraviolet ray curable-type composition in the composition flow path of the recording apparatus with the maintenance liquid, and filling of the inside of the composition flow path with the maintenance liquid.

EXAMPLES

Hereinafter, the invention will be more specifically described using Examples and Comparative Examples. The invention is not limited to these Examples. Material of Maintenance Liquid and Ultraviolet Ray Curable-Type Composition The main materials of a maintenance liquid and an ultraviolet ray curable-type composition used in the following Examples and Comparative Examples are as follows.

Polymerizable Compound

V #192 (phenoxyethyl acrylate, manufactured by Osaka Organic Chemical Industry Ltd., saturation solubility of IRGACURE 819 of 10% by mass, saturation solubility of DAROCUR TPO of 20% by mass, viscosity of 8.7 mPa·s, molecular weight of 192)

SR508 (dipropylene glycol diacrylate, manufactured by Sartomer Co., Ltd., saturation solubility of IRGACURE 819 of 4.0% by mass, saturation solubility of DAROCUR TPO of 8% by mass, viscosity of 10 mPa·s, molecular weight of 242)

VEEA (2-(2-vinyloxyethoxy)ethyl acrylate, manufactured by Nippon Shokubai Co., Ltd., saturation solubility of IRGACURE 819 of 6.0% by mass, saturation solubility of DAROCUR TPO of 12% by mass, viscosity of 2.5 mPa·s, molecular weight of 186)

DA-141 (2-hydroxy-3-phenoxypropyl acrylate, manufactured by Nagase Chemtex Corporation, saturation solubility of IRGACURE 819 of 5.5% by mass, saturation solubility of DAROCUR TPO of 11% by mass, viscosity of 150 mPa·s, molecular weight of 222)

IBXA (isobornyl acrylate, manufactured by Toagosei Co., Ltd., saturation solubility of IRGACURE 819 of 3.8% by mass, saturation solubility of DAROCUR TPO of 7.6% by mass, viscosity of 7.7 mPa·s, molecular weight of 208)

FA-BZA (benzyl acrylate, manufactured by Hitachi Chemical Co. Ltd., saturation solubility of IRGACURE 819 of 14.2% by mass, saturation solubility of DAROCUR TPO of 28.4% by mass, viscosity of 5.5 mPa·s, molecular weight of 162)

LA (lauryl acrylate, manufactured by Osaka Organic Chemical Industry Ltd., saturation solubility of IRGACURE 819 of 2.0% by mass, saturation solubility of DAROCUR TPO of 4% by mass, viscosity of 4.0 mPa·s, molecular weight of 240)

IOAA (isooctyl acrylate, manufactured by Osaka Organic Chemical Industry Ltd., saturation solubility of IRGACURE 819 of 3.0% by mass, saturation solubility of DAROCUR TPO of 6% by mass, viscosity of 2.0 mPa·s, molecular weight of 184)

A-DPH (dipentaerythritol hexaacrylate, manufactured by Shin-Nakamura Chemical Co., Ltd., saturation solubility of IRGACURE 819 of 1% by mass, saturation solubility of DAROCUR TPO of 2% by mass, viscosity of 6600 mPa·s, molecular weight of 578)

Solvent
    TPGmME (tripropylene glycol monomethyl ether)
Surfactant
    BYK-UV3500 (manufactured by BASF Corp.)
Polymerization Inhibitor
    MEHQ (p-methoxyphenol, manufactured by Tokyo Chemical Industry Co., Ltd.)
Photopolymerization Initiator
    IRGACURE 819 (manufactured by BASF Corp.)
    DAROCUR TPO (manufactured by BASF Corp.)
    IRGACURE 184 (manufactured by BASF Corp.)
    IRGACURE 369 (manufactured by BASF Corp.)
Coloring Material
    Carbon Black
Preparation of Maintenance Liquid and Ultraviolet Ray Curable-Type Composition Each material was mixed according to the composition shown in the following Tables 1 and 2, and the mixture was sufficiently stirred, whereby each maintenance liquid and each ultraviolet ray curable-type composition were obtained. Moreover, in the following Tables 1 and 2, the unit of numerical values is % by mass, and the total is 100.0% by mass.

Measurement of Saturation Solubility of Acyl Phosphine Oxide-Based Photopolymerization Initiator in Polymerizable Compound A photopolymerization initiator was added to 300 g of a polymerizable compound at 20° C., then, the mixture was stirred for 3 hours at a stirring rotational speed of 300 rpm, and it was checked whether an acyl phosphine oxide-based photopolymerization initiator (bis (2,4,6-trimethylbenzoyl)-phenylphosphine oxide) was dissolved or not. This operation was repeated, and the maximum amount added of the dissolved acyl phosphine oxide-based photopolymerization initiator was checked. Moreover, it was visually checked whether the acyl phosphine oxide-based photopolymerization initiator was dissolved or not, and it was determined whether the acyl phosphine oxide-based photopolymerization initiator was dissolved or not by the presence or absence of the acyl phosphine oxide-based photopolymerization initiator remaining in a granular form or cloudiness of overall polymerizable compound. Based on the maximum amount added of the dissolved acyl phosphine oxide-based photopolymerization initiator, the saturation solubility of the acyl phosphine oxide-based photopolymerization initiator in the polymerizable compound was calculated by the following equation.

Saturation solubility of the acyl phosphine oxide-based photopolymerization initiator in the polymerizable compound=maximum mass of the dissolved acyl phosphine oxide-based photopolymerization initiator/(mass of the polymerizable compound+maximum mass of the dissolved acyl phosphine oxide-based photopolymerization initiator)×100 (%)

Cleaning Ability

A 200 mm polypropylene tube having a diameter of 2 mm was filled with the ultraviolet ray curable-type composition. 20 mL of the maintenance liquid was flowed into the polypropylene tube filled with the ultraviolet ray curable-type composition at a flow velocity of 0.6 g/min. The liquid in the tube after 20 mL of the maintenance liquid was flowed was collected, then, the collected liquid was diluted to be 1/100, and the absorbance thereof was measured. On the basis of the obtained absorbance, the cleaning ability was evaluated according to the following evaluation criteria. A lower absorbance means that the maintenance liquid has higher cleaning ability.

Evaluation Criteria
    A: Absorbance was less than 0.5.
    B: Absorbance was equal to or greater than 0.5 and less than 1.0.
    C: Absorbance was equal to or greater than 1.0, and precipitate derived from polymerization initiator was not generated.
    D: Absorbance was equal to or greater than 1.0, and precipitate derived from polymerization initiator was generated.

Viscosity

The viscosities of the maintenance liquid and the ultraviolet ray curable-type composition at 20° C. were measured using a viscometer (trade name: MCR-300, manufactured by Physica Co., Ltd.). On the basis of the obtained viscosity, the viscosity was evaluated according to the following evaluation criteria.

Evaluation Criteria
    A: Viscosity at 20° C. was equal to or less than 20 mPa·s.
    B: Viscosity at 20° C. was greater than 20 mPa·s.

Odor

The odor of the maintenance liquid was snuffed, and the odor was evaluated according to the following evaluation criteria.

Evaluation Criteria
    A: There was no irritating smell
    B: There was irritating smell Curability of Ultraviolet Ray Curable-Type Composition The test of the curability of the ultraviolet ray curable-type composition was performed using a printer (remodeled PX-7500, manufactured by Seiko Epson Corporation). First, a maintenance liquid cartridge was connected to a discharge head with a 200 mm polypropylene tube having a diameter of 2 mm. Next, in a state in which the portion from the tube to the discharge head was filled with the maintenance liquid, the maintenance liquid cartridge was exchanged with an ultraviolet ray curable-type composition cartridge, and 20 mL of the ultraviolet ray curable-type composition was flowed to the tube at a flow velocity of 0.6 g/min. Then, the ultraviolet ray curable-type composition was discharged to a recording medium (trade name: Lumirror S10, manufactured by Toray Industries, Inc.) from the discharge head, and the ultraviolet ray curable-type composition which was attached to the recording medium was irradiated with ultraviolet rays having an irradiation energy of 200 mJ/cm², whereby a coating film of solid pattern having a thickness of 10 μm was formed. As the ultraviolet ray lamps, an LED having an emission peak wavelength of 395 nm was used. In addition, the irradiation intensity [mW/cm²] on the irradiated surface to be radiated from the light source was measured, and from the product of the irradiation intensity and a duration of irradiation [s], the irradiation energy [mJ/cm²] was determined. The measurement of the irradiation intensity was performed using an ultraviolet ray intensity meter UM-10 and a light-receiving unit UM-400 (manufactured by Konica Minolta Sensing, Inc.).

The obtained coating film was rubbed with a cotton swab under the conditions of a load of 100 gN, a case where the ultraviolet ray curable-type composition was attached to the cotton swab or a case where the coating film of the ultraviolet ray curable-type composition on a recording medium was scratched was determined to have tackiness. On the basis of the determination of the tackiness, the curability of the ultraviolet ray curable-type composition was evaluated according to the following evaluation criteria.

Evaluation Criteria

A: Tackiness was not confirmed.

B: Curing of a coating film was confirmed, however, scratches of the coating film were observed, and thus, tackiness was confirmed.

C: Curing defects of a coating film were confirmed, and the coating film was in the state in which wet feeling totally remained.

TABLE 1

|  |  |  | Example |  |  |  |  |  |  |
|---|---|---|---|---|---|---|---|---|---|
|  |  |  | 1 | 2 | 3 | 4 | 5 | 6 | 7 |
| Maintenance liquid | Maintenance liquid No. |  | 1 | 2 | 3 | 4 | 5 | 6 | 7 |
|  | Polymerizable compound | V#192 | 40 | 40 | 19.3 | 40 | 40 | 40 | 40 |
|  |  | SR508 | 19.3 | 29.3 | 40 | 19.3 | 19.3 | 19.3 | 19.3 |
|  |  | VEEA | 40 | 30 | 40 |  |  |  |  |
|  |  | DA-141 |  |  |  | 40 |  |  |  |
|  |  | IBXA |  |  |  |  | 40 |  |  |
|  |  | FA-BZA |  |  |  |  |  | 40 |  |
|  |  | LA |  |  |  |  |  |  | 40 |
|  |  | IOOA |  |  |  |  |  |  |  |
|  | Solvent | TPGmME |  |  |  |  |  |  |  |
|  | Surfactant | BYK-UV3500 | 0.5 | 0.5 | 0.5 | 0.5 | 0.5 | 0.5 | 0.5 |
|  | Polymerization inhibitor | MEHQ | 0.2 | 0.2 | 0.2 | 0.2 | 0.2 | 0.2 | 0.2 |
|  | Total |  | 100 | 100 | 100 | 100 | 100 | 100 | 100 |
|  | Content of polymerizable compound in which saturation solubility is equal to or greater than 5% |  | 80 | 70 | 59.3 | 80 | 40 | 80 | 40 |
|  | Solubility parameter |  | 7.17 | 6.97 | 5.93 | 6.67 | 6.29 | 10.45 | 5.57 |
| Ultraviolet ray curable-type composition No. |  |  | 1 | 1 | 1 | 1 | 1 | 1 | 1 |
| Cleaning ability |  |  | A | A | B | B | B | A | C |
| Viscosity |  |  | A | A | A | B | A | A | A |
| Odor |  |  | A | A | A | A | A | B | A |
| Curability of ultraviolet ray curable-type composition |  |  | A | A | A | A | A | A | A |

|  |  |  | Example |  | Comparative Example |  |  |  |  |
|---|---|---|---|---|---|---|---|---|---|
|  |  |  | 8 | 9 | 1 | 2 | 3 | 4 | 5 |
| Maintenance liquid | Maintenance liquid No. |  | 8 | 9 | 1 | 3 | 10 | 11 | 10 |
|  | Polymerizable compound | V#192 | 40 | 40 | 40 | 19.3 |  |  |  |
|  |  | SR508 | 19.3 | 19.8 | 19.3 | 40 | 19.3 |  | 19.3 |
|  |  | VEEA |  | 40 | 40 | 40 |  |  |  |
|  |  | DA-141 |  |  |  |  |  |  |  |
|  |  | IBXA |  |  |  |  |  |  |  |
|  |  | FA-BZA |  |  |  |  |  |  |  |
|  |  | LA |  |  |  |  | 40 |  | 40 |
|  |  | IOOA | 40 |  |  |  | 40 |  | 40 |
|  | Solvent | TPGmME |  |  |  |  |  | 100 |  |
|  | Surfactant | BYK-UV3500 | 0.5 | 0.5 | 0.5 | 0.5 | 0.5 |  | 0.5 |
|  | Polymerization inhibitor | MEHQ | 0.2 | 0.2 | 0.2 | 0.2 | 0.2 |  | 0.2 |
|  | Total |  | 100 | 100 | 100 | 100 | 100 | 100 | 100 |
|  | Content of polymerizable compound in which saturation solubility is equal to or greater than 5% |  | 40 | 80 | 80 | 59.3 | 0 | 0 | 0 |
|  | Solubility parameter |  | 5.97 | 7.19 | 7.17 | 5.93 | 2.77 | — | 2.77 |
| Ultraviolet ray curable-type composition No. |  |  | 1 | 1 | 2 | 2 | 1 | 2 | 2 |
| Cleaning ability |  |  | C | B | A | A | D | A | B |
| Viscosity |  |  | A | A | A | A | A | A | A |
| Odor |  |  | A | A | A | A | A | A | A |
| Curability of ultraviolet ray curable-type composition |  |  | A | A | B | B | A | C | B |

TABLE 2

| Ultraviolet ray curable-type composition No. | | | 1 | 2 |
|---|---|---|---|---|
| Ultraviolet ray curable-type composition | Polymerizable compound | V#192 | 30 | 30 |
| | | SR508 | 30 | 30 |
| | | VEEA | 20 | 20 |
| | | A-DPH | 8.3 | 8.3 |
| | Photopolymerization initiator | IRGACURE 819 | 5 | |
| | | DAROCUR TPO | 4 | |
| | | IRGACURE 184 | | 4 |
| | | IRGACURE 369 | | 5 |
| | Surfactant | BYK-UV3500 | 0.5 | 0.5 |
| | Polymerization inhibitor | MEHQ | 0.2 | 0.2 |
| | Coloring material | Carbon black | 2 | 2 |
| | Total | | 100 | 100 |
| | Content of polymerizable compound in which saturation solubility is equal to or greater than 5% | | 50 | 50 |
| | Viscosity | | B | B |

In Comparative Examples 1 and 2, it was found that in the case of a recording apparatus using an ultraviolet ray curable-type composition containing a polymerization initiator other than the acyl phosphine oxide-based photopolymerization initiator, the curability of the ultraviolet ray curable-type composition was poor.

In Comparative Example 3, it was found that cleaning ability was poor since the maintenance liquid included polymerizable compounds, but a polymerizable compound in which the saturation solubility of the acyl phosphine oxide-based photopolymerization initiator at 20° C. was equal to or greater than 5.0% by mass was not included.

In addition, in Comparative Example 4, it was found that the curability of the ultraviolet ray curable-type composition after maintenance was poor since the maintenance liquid did not include any polymerizable compound.

Furthermore, in Comparative Example 5, it was found that when the ultraviolet ray curable-type composition used in a recording apparatus did not include the acyl phosphine oxide-based photopolymerization initiator, cleaning ability was relatively favorable even in the case where the maintenance liquid did not include a polymerizable compound in which the saturation solubility of the acyl phosphine oxide-based photopolymerization initiator at 20° C. was equal to or greater than 5.0% by mass, however, the curability of the ultraviolet ray curable-type composition was poor similarly to that in Comparative Examples 1 and 2. Based on what has been described above, the maintenance liquid of the embodiment is required since excellent cleaning ability is obtained in the case of using an ultraviolet ray curable-type composition having an excellent curability of an ultraviolet ray curable-type composition including the acyl phosphine oxide-based photopolymerization initiator.

What is claimed is:

1. A maintenance method, comprising:
performing maintenance of a device equipped with a discharge head for discharging an ultraviolet ray curable-type composition containing an acyl phosphine oxide-based photopolymerization initiator toward an attachment object using a maintenance liquid having a polymerization inhibitor included in an amount that is equal to or greater than 0.05% by mass with respect to a total amount of the maintenance liquid and a polymerizable compound in which a saturation solubility of an acyl phosphine oxide-based photopolymerization initiator at 20° C. is equal to or greater than 5.0% by mass, wherein the polymerizable compound includes at least any one of (i) a vinyl ether group-containing (meth) acrylic acid ester represented by the following general formula (1), a content of the vinyl ether group-containing (meth)acrylic acid ester represented by general formula (1) being equal to or greater than 15% by mass with respect to the total amount of the maintenance liquid and (ii) a monofunctional (meth)acrylate compound having an aromatic ring, a content of the monofunctional (meth)acrylate compound having an aromatic ring being equal to or greater than 5% by mass, and equal to or less than 90% by mass with respect to the total amount of the maintenance liquid;

$$CH_2=CR1-COOR2-O-CH=CH-R3 \qquad (1)$$

wherein R1 represents a hydrogen atom or a methyl group, R2 represents a divalent organic residue having 2 to 20 carbon atoms, and R3 represents a hydrogen atom or a monovalent organic residue having 1 to 11 carbon atoms.

2. The method according to claim 1, wherein the viscosity of the polymerizable compound at 20° C. is equal to or less than 30 mPa·s.

3. The maintenance method according to claim 1, wherein a content of the polymerizable compound is equal to or greater than 40% by mass with respect to the total amount of the maintenance liquid.

4. The maintenance method according to claim 1, wherein the viscosity at 20° C. is equal to or less than 20 mPa·s.

5. The maintenance method according to claim 1, wherein the viscosity at 20° C. is lower than the viscosity of the ultraviolet ray curable-type composition at 20° C. by equal to or greater than 5 mPa·s.

6. The maintenance method according to claim 1, wherein the ultraviolet ray curable-type composition includes the polymerizable compound, and a content of the polymerizable compound in the maintenance liquid is larger than a content of the polymerizable compound in the ultraviolet ray curable-type composition by equal to or greater than 10% by mass.

7. The maintenance method according to claim 1, wherein the saturation solubility of the acyl phosphine oxide-based photopolymerization initiator at 20° C. with respect to the polymerizable compound is equal to or greater than 8.0% by mass.

8. The maintenance method according to claim 1, further comprising:
at least any one of a silicone-based surfactant and a fluorine-based surfactant.

9. The maintenance method according to claim 1, wherein the molecular weight of the polymerizable compound is equal to or greater than 170.

10. The maintenance method according to claim 1, wherein a content of the acyl phosphine oxide-based photopolymerization initiator in the ultraviolet ray curable-type composition is equal to or greater than 5.0% by mass.

11. The maintenance method according to claim 1, wherein a solubility parameter is equal to or greater than 5.0.

12. The maintenance method according to claim 1, wherein the saturation solubility is a saturation solubility of bis(2,4,6-trimethylbenzoyl)-phenylphosphine oxide at 20° C.

13. The maintenance method according to claim 1, wherein the device has an ultraviolet ray emitting diode for irradiating the discharged ultraviolet ray curable-type composition with ultraviolet rays, and the ultraviolet ray emitting element has an emission peak wavelength in a range of 360 nm to 420 nm.

14. The maintenance method according to claim 1, wherein the device is equipped with a heating mechanism for heating the ultraviolet ray curable-type composition, and discharges the heated composition.

15. The maintenance method of claim 1, wherein the maintenance liquid includes the monofunctional (meth)acrylate having the aromatic ring.

16. The maintenance method of claim 1, wherein the maintenance liquid includes the monofunctional (meth)acrylate having an aromatic ring, wherein a content of the monofunctional (meth)acrylate having the aromatic ring is equal to or greater than 15% and equal to or less than 55% by mass with respect to a total amount of the maintenance liquid.

17. The maintenance method according to claim 1, wherein the polymerization inhibitor is included in an amount that is equal to or greater than 0.05% by mass and equal to or less than 0.5% by mass with respect to the total amount of the maintenance liquid.

18. The maintenance method according to claim 1, wherein the monofunctional (meth)acrylate compound having an aromatic ring comprises at least one of phenoxyethyl acrylate, 2-hydroxy-3-phenoxypropyl acrylate, or benzyl acrylate.

19. The maintenance method according to claim 1, wherein the polymerizable compound comprising a vinyl ether group-containing (meth)acrylic acid ester represented by general formula (1) comprises 2-(2-vinyloxyethoxy)ethyl acrylate.

20. The maintenance method according to claim 1, wherein the content of the vinyl ether group-containing (meth)acrylic acid ester represented by general formula (1) is equal to or greater than 15% by mass and equal to or less than 55% by mass with respect to the total amount of the maintenance liquid.

* * * * *